United States Patent
Murphy et al.

(10) Patent No.: US 10,227,915 B2
(45) Date of Patent: Mar. 12, 2019

(54) WASTEGATE SUBASSEMBLY FOR A TURBOCHARGER

(71) Applicant: BorgWarner Inc., Auburn Hills, MI (US)

(72) Inventors: Michael Murphy, Hendersonville, NC (US); Rajmohan Chandramohanan, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 457 days.

(21) Appl. No.: 14/955,104

(22) Filed: Dec. 1, 2015

(65) Prior Publication Data

US 2016/0169090 A1    Jun. 16, 2016

Related U.S. Application Data

(60) Provisional application No. 62/089,922, filed on Dec. 10, 2014.

(51) Int. Cl.
*F02B 37/18*    (2006.01)

(52) U.S. Cl.
CPC .......... *F02B 37/183* (2013.01); *F02B 37/186* (2013.01); *Y02T 10/144* (2013.01)

(58) Field of Classification Search
CPC ..... F02B 37/183; F02B 37/186; Y02T 10/144
USPC .................................................. 60/602, 605.1
See application file for complete search history.

(56) References Cited

U.S. PATENT DOCUMENTS

| 5,046,317 | A | * | 9/1991 | Satokawa | F01D 17/105 415/151 |
| 5,079,921 | A | * | 1/1992 | McCandless | F02B 37/025 123/323 |
| 5,146,752 | A | * | 9/1992 | Bruestle | F01D 17/105 415/164 |
| 5,148,678 | A | * | 9/1992 | Ueda | F02B 37/22 137/338 |
| 6,543,228 | B2 | * | 4/2003 | Deacon | F02B 37/183 137/527 |
| 2011/0175025 | A1 | * | 7/2011 | Schall | F01D 17/105 252/182.33 |
| 2013/0202431 | A1 | * | 8/2013 | Heidingsfelder | F01D 17/20 415/220 |

* cited by examiner

*Primary Examiner* — Hoang Nguyen
(74) *Attorney, Agent, or Firm* — BrooksGroup

(57) ABSTRACT

A turbocharger turbine (2) includes a wastegate subassembly (50) that includes a mounting plate (51) having a bore (55) therethrough, a valve shaft (60) disposed in the bore (55), and a wastegate valve (30) including a valve body (31) and a valve arm (36) that secures the valve body (31) to an end of the valve shaft (60). The wastegate subassembly (50) is preassembled prior to assembly with the turbocharger (1), and is detachably secured to an outer surface of the turbine exhaust gas inlet (10) such that valve body (31) is positioned to control exhaust gas flow through a bypass port (13) that extends between the exhaust gas inlet (10) and an exhaust gas outlet (12), and bypasses the turbine wheel (16).

15 Claims, 6 Drawing Sheets

WASTEGATE SUBASSEMBLY FOR A TURBOCHARGER

CROSS-REFERENCE TO RELATED APPLICATION

This application claims priority to and all the benefits of U.S. Provisional Application No. 62/089,922, filed on Dec. 10, 2014, and entitled "Wastegate Subassembly For A Turbocharger."

BACKGROUND

1. Field of the Invention

This disclosure relates to an exhaust gas flow control device for an exhaust gas turbocharger turbine including a wastegate.

2. Description of Related Art

A turbocharger is a type of forced induction system used with internal combustion engines. Turbochargers deliver compressed air to an engine intake, allowing more fuel to be combusted, thus boosting the horsepower of an engine without significantly increasing engine weight. Thus, turbochargers permit the use of smaller engines that develop the same amount of horsepower as larger, naturally aspirated engines. Using a smaller engine in a vehicle has the desirable effect of decreasing the mass of the vehicle, increasing performance, and enhancing fuel economy. Moreover, the use of turbochargers permits more complete combustion of the fuel delivered to the engine, which in turn reduces undesirable engine emissions.

SUMMARY

In some aspects, a wastegate subassembly includes a mounting plate comprising a mounting surface, an outer surface that is opposed to the mounting surface and a bore that opens at both the mounting surface and the outer surface. The wastegate subassembly also includes a valve shaft and a wastegate valve. The valve shaft is disposed in the bore such that a first end of the valve shaft resides outside the bore on a mounting surface-side of the mounting plate, and a second end of the valve shaft resides outside the bore on an outer surface-side of the mounting plate. The wastegate valve includes a valve body and a valve arm that secures the valve body to the first end of the valve shaft. The mounting plate is configured to be selectively connected to and detached from a turbocharger housing.

The wastegate subassembly may include one or more of the following features: A mounting plate is planar, having a rectangular peripheral shape, and including bolt openings configured to receive a fastener that secures the mounting plate to a housing of a turbocharger turbine. A valve body comprising a planar valve face, and protruding stem on a side opposed to the valve face. A valve arm comprising a plate portion that is connected to the valve body, and a hollow cylindrical portion disposed at one end of the plate portion, wherein the hollow cylindrical portion is configured to receive a valve shaft therein and is disposed at one end of the plate portion such that a longitudinal axis of the hollow cylindrical portion is parallel to a broad surface of the plate portion. The plate portion further including a plate through opening that receives a portion of the valve body, the hollow cylindrical portion further including a first open end, a second open end, and a central opening disposed between the first open end and the second open end, wherein the plate through opening is axially offset relative to the central opening of the hollow cylindrical portion. A bushing disposed in a bore formed in the wastegate subassembly, wherein the bushing is configured to support the valve shaft for rotation within the bore. A link arm fixed to the second end of the valve shaft, such that the link arm is configured to connect the valve shaft to an actuator.

In some aspects, a turbocharger includes a turbine housing defining an exhaust gas inlet, an exhaust gas outlet and a volute that connects the exhaust gas inlet to the exhaust gas outlet. A turbine wheel is disposed in the exhaust gas inlet between the volute and the exhaust gas outlet, and a bypass port is formed in the exhaust gas inlet that communicates with the exhaust gas outlet and bypasses the turbine wheel. A second port is formed in the exhaust gas inlet in the vicinity of the bypass port. The turbocharger includes a wastegate subassembly. The wastegate subassembly includes a mounting plate having a mounting surface, an outer surface that is opposed to the mounting surface and a bore that opens at both the mounting surface and the outer surface. The wastegate subassembly includes a valve shaft disposed in the bore such that a first end of the valve shaft resides outside the bore on a mounting surface-side of the mounting plate, and a second end of the valve shaft resides outside the bore on an outer surface-side of the mounting plate. In addition, the wastegate subassembly includes a wastegate valve including a valve body and a valve arm that secures the valve body to the first end of the valve shaft. The mounting plate is detachably secured to an outer surface of the exhaust gas inlet such that the mounting plate closes a second port and the valve body is positioned to control exhaust gas flow through the bypass port.

The turbocharger may include one or more of the following features: A turbine housing that is formed of a first material, and the mounting plate is formed of a second material, wherein the second material different from the first material. A bushing disposed in the bore, wherein the bushing is configured to support the valve shaft for rotation within the bore. A link arm fixed to the second end of the valve shaft, the link arm configured to connect the valve shaft to an actuator. The mounting plate is planar, has a rectangular peripheral shape, and includes bolt openings configured to receive a fastener that secures the mounting plate to a housing of a turbocharger turbine. A valve arm comprising a plate portion that is connected to the valve body, and a hollow cylindrical portion disposed at one end of the plate portion, the hollow cylindrical portion configured to receive the valve shaft therein and is disposed at one end of the plate portion such that a longitudinal axis of the hollow cylindrical portion is parallel to a broad surface of the plate portion. The plate portion further including a plate through opening that is fixed to a portion of the valve body, and the hollow cylindrical portion further including a first open end, a second open end, and a central opening disposed between the first open end and the second open end, wherein the plate through opening is axially offset relative to the central opening.

In some aspects, a method of assembling a wastegate valve with an exhaust gas inlet of a turbocharger turbine such that the wastegate valve controls the flow of exhaust gas through a bypass port formed in the exhaust gas inlet including the following method steps: Providing a pre-assembled wastegate subassembly. The wastegate subassembly including a mounting plate, a valve shaft and a wastegate valve. The mounting plate including a mounting surface, an outer surface that is opposed to the mounting surface and a bore that opens at both the mounting surface and the outer surface. The valve shaft is disposed in the bore such that a first end of the valve shaft resides outside the bore on a mounting surface-side of the mounting plate, and a second end of the valve shaft resides outside the bore on an outer surface-side of the mounting plate. The wastegate valve including a valve body and a valve arm that secures the valve body to the first end of the valve shaft. The method further including inserting the first end of the valve shaft through a second port formed in the exhaust gas inlet such that the wastegate valve is disposed adjacent the bypass port and the mounting plate abuts an outer surface of the exhaust gas inlet, and securing the mounting plate to the outer surface of the exhaust gas inlet.

A turbocharger includes a turbine housing that defines an exhaust gas inlet, an exhaust gas outlet and a volute that connects the exhaust gas inlet to the exhaust gas outlet. A turbine wheel is disposed in the exhaust gas inlet between the volute and the exhaust gas outlet. In addition, a bypass port is provided in the exhaust gas inlet that communicates with the exhaust gas outlet and bypasses the turbine wheel. A wastegate valve controls flow through the bypass port. The wastegate valve is normally closed, and is opened during certain engine operating conditions, for example, to divert exhaust gas away from the turbine wheel during high exhaust gas pressure conditions. The wastegate valve is part of a wastegate subassembly that includes a mounting plate and a valve shaft that extends through a bore formed in the plate. The wastegate valve includes a valve body and a valve arm that secures the valve body to one end of the valve shaft, and a link arm that is fixed to the opposed end of the valve shaft. The link arm is used to connect the wastegate valve to an actuator, for example, via a linkage. The wastegate subassembly is pre-assembled as a unit prior to assembly with the turbine housing, and then is detachably secured to the exhaust gas inlet such that the valve body can control exhaust gas flow through the bypass port.

Since the wastegate subassembly is pre-assembled as a unit prior to assembly with the turbine housing, and is thus completely assembled before reaching the turbocharger assembly line. This offline assembly will allow the components of the wastegate subassembly to be welded in the most efficient way and with a clear field of view, thereby permitting pre-assembly in large batches. In addition, pre-assembly allows the subassembly and its components to be easily optimized and interchanged. In one example, a series of standardized and interchangeable wastegate subassemblies can be created using current design practices. The series can include wastegate subassemblies that have varied valve diameters and shapes, valve offsets, valve arm shapes, shaft diameters, shaft lengths, etc. As a result, turbochargers can be quickly and easily provided to meet individual customer specifications.

Since the wastegate subassembly is detachably secured to the turbine housing exhaust gas inlet, it can be easily removed as a unit for servicing using common tools. This can be compared to servicing some conventionally assembled wastegate valves in which the welds must be ground off in order to remove the wastegate valve components, and/or the bushing which supports the shaft in the turbine housing, and retaining pin, must be drilled out.

Since the wastegate subassembly is pre-assembled as a unit prior to assembly with the turbine housing, the volume of the wastegate receiving area of the turbine housing can be made smaller than the corresponding area of turbine housings that receive conventional wastegate valves. The relatively small wastegate valve receiving area is advantageous since it minimizes the negative effects of the area on exhaust gas flow through the turbine housing. In some embodiments, the relatively small wastegate valve receiving area will allow the turbine housing to have improved aerodynamic performance with optimal outlet geometries (i.e., standard angled diffusers) and standard marmon outlets.

The wastegate subassembly advantageously provides cost benefits for manufacturing a turbocharger turbine relative to some conventional configurations. For example, conventional components such as the access opening and cover can be eliminated. This is possible since the wastegate valve seat, which is typically machined via the access opening, can now be machined via the opening which receives the wastegate subassembly (e.g., the wastegate subassembly port). Moreover, since the wastegate subassembly is pre-assembled outside the turbine housing, there is no need to perform assembly functions such as welding through the access opening. In another example, the shaft-supporting bushing and locking pin can be eliminated in embodiments in which the mounting plate is formed of a suitable material (i.e., material suitable for forming a bearing), thereby reducing manufacturing costs and assembly time.

Since the wastegate subassembly is pre-assembled as a unit prior to assembly with the turbine housing, the method of assembling the wastegate subassembly is easier and faster than the method of assembling most conventional wastegate valves on a turbine housing, wherein at least some of the components are individually assembled within the turbine housing under conditions of limited visibility and working space.

BRIEF DESCRIPTION OF THE DRAWINGS

Advantages of the turbocharger turbine wastegate sub assembly will be readily appreciated as the same becomes better understood by reference to the following detailed description when considered in connection with the accompanying drawings wherein.

DETAILED DESCRIPTION

Figure 1:
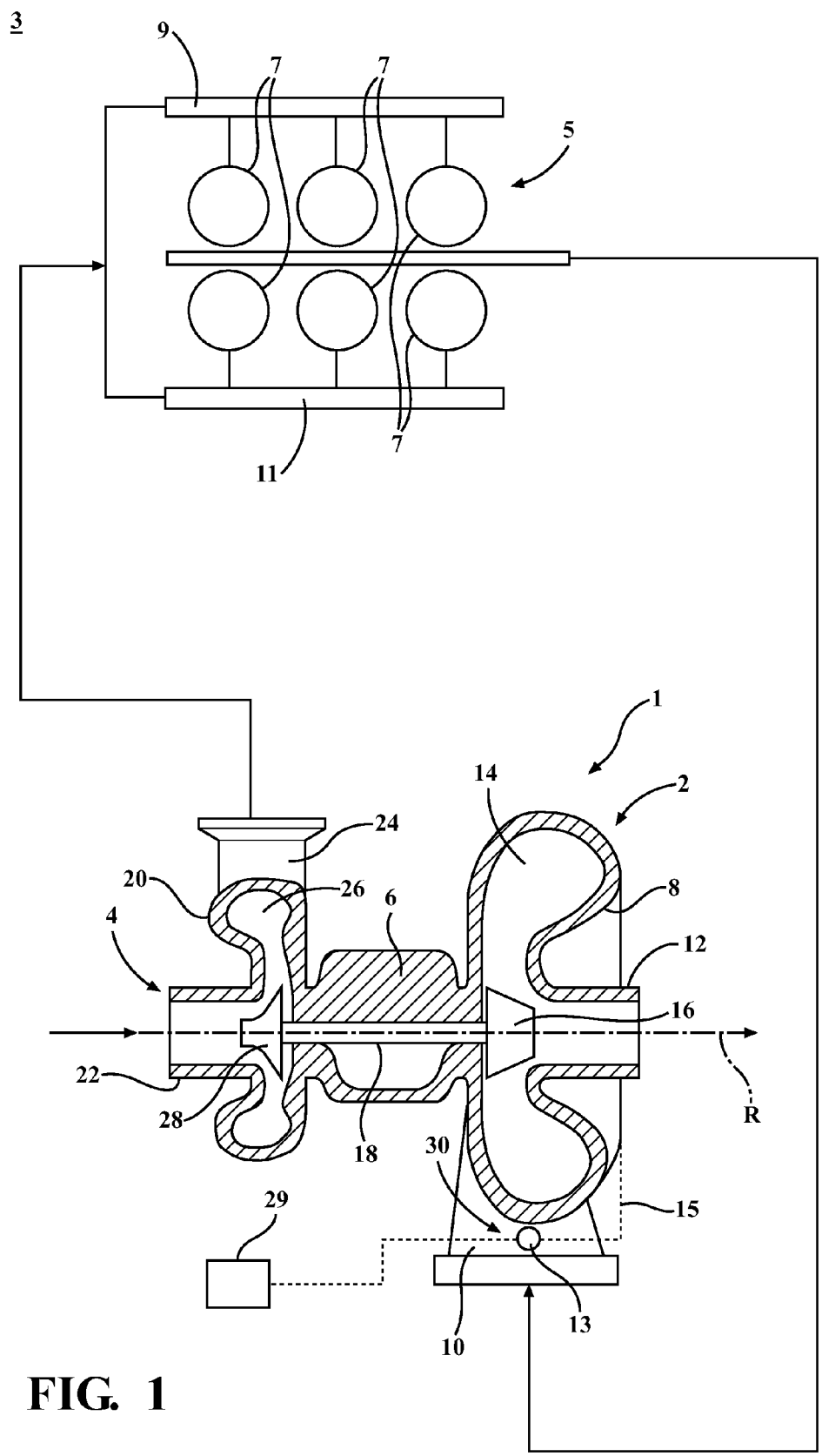
FIG. 1 is a schematic illustration of an engine system including a wastegated exhaust gas turbocharger.
Figure 2:
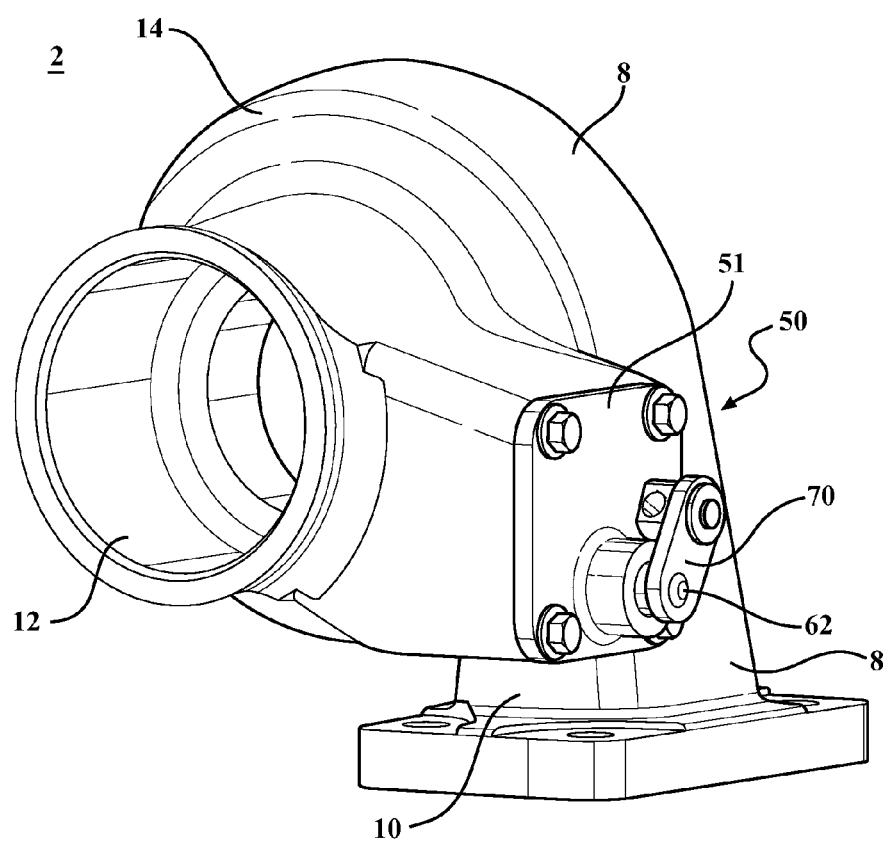
FIG. 2 is a perspective view of a turbine section of the turbocharger of FIG. 1 including a wastegate subassembly secured to the turbine housing exhaust gas inlet.

Referring to FIGS. 1 and 2, an engine system 3 includes an engine 5 and an exhaust gas turbocharger 1 connected to the engine 5. The exhaust gas turbocharger 1 includes a turbine section 2, a compressor section 4, and a bearing housing 6 disposed between and connecting the compressor section 4 to the turbine section 2. The turbine section 2 includes a turbine housing 8 that defines an exhaust gas inlet 10, an exhaust gas outlet 12, and a turbine volute 14 disposed in the fluid path between the exhaust gas inlet 10 and the exhaust gas outlet 12. A turbine wheel 16 is disposed in the turbine housing 8 between the turbine volute 14 and the exhaust gas outlet 12. A shaft 18 is connected to the turbine wheel 16, is rotatably supported within in the bearing housing 6, and extends into the compressor section 4. The compressor section 4 includes a compressor housing 20 that defines an air inlet 22, an air outlet 24, and a compressor volute 26. A compressor wheel 28 is disposed in the compressor housing 20 between the air inlet 22 and the compressor volute 26. The compressor wheel 28 is connected to, and driven by, the shaft 18.

In use, the turbine wheel 16 is rotatably driven by an inflow of exhaust gas supplied from the exhaust manifold 11 of the engine 5. Since the shaft 18 connects the turbine wheel 16 to the compressor wheel 28, the rotation of the turbine wheel 16 causes rotation of the compressor wheel 28. Rotation of the compressor wheel 28 provides a pressure boost to the engine 5 by increasing the air mass flow rate, airflow density and air pressure delivered to the cylinders 7 of the engine via an outflow of air from the compressor air outlet 24, which is connected to the air intake manifold 9 of the engine.

When the pressure of the exhaust gas is high, there may be more exhaust pressure than is required to provide the desired pressure boost to the cylinders 7 of the engine 5. One solution for this problem is to divert exhaust gas away from the turbine wheel 16 during high exhaust gas pressure conditions, so that the amount of exhaust gas reaching the turbine wheel 16 is the quantity needed to provide optimum pressure boost. A wastegate valve 30 is used to divert exhaust gases away from the turbine wheel 16. Diversion of exhaust gases controls the turbine wheel rotational speed, which in turn controls the rotational speed of the compressor wheel 28. By controlling the rotational speed of the compressor wheel 28, the wastegate valve 30 is able to regulate the maximum boost pressure provided to the cylinders 7 of the engine 5 by the exhaust gas turbocharger 1.

The turbine housing 8 includes a bypass passage 15 that permits exhaust gas to flow directly from the exhaust gas inlet 10 to the exhaust gas outlet 12 while bypassing the turbine volute 14 and the turbine wheel 16. The bypass passage 15 opens to the exhaust gas inlet via a bypass port 13, which is surrounded by a planar valve seat 13a (FIG. 6 and FIG. 8) that cooperates with the wastegate valve 30 to control the flow of exhaust gas through the bypass passage 15.

The wastegate valve 30 is disposed on the turbine housing 8 upstream of the turbine wheel 16, and is actuated by an actuator 29. In some embodiments, the actuator 29 is pneumatic, and uses the compressor section 4 of the exhaust gas turbocharger 1 as a source of pressurized fluid.

Referring also to FIGS. 3-6, the wastegate valve 30 is part of a wastegate subassembly 50 that also includes a mounting plate 51, a valve shaft 60, a bushing 68 that supports the valve shaft 60 within the mounting plate 51, and a link arm 70. The wastegate subassembly 50 is a preassembled unit that is secured to the exhaust gas inlet 10 of the turbine housing 8, as discussed further below.

The turbine housing 8 includes a wastegate subassembly port 17 (FIG. 6) formed in the exhaust gas inlet 10. The wastegate subassembly port 17 is provided at a location corresponding to the location of a conventional wastegate valve shaft port and replaces the conventional valve shaft port. The wastegate subassembly port 17 is larger than some conventional wastegate valve shaft ports. For example, the wastegate subassembly port 17 is dimensioned to permit a fully assembled wastegate valve 30 to pass therethrough.

The mounting plate 51 has a shape that corresponds to the shape of the wastegate subassembly port 17. In the illustrated embodiment, the wastegate subassembly port 17 and the mounting plate 51 have a generally rectangular shape. In addition, the mounting plate 51 has a thickness that is much smaller than a length and width of the mounting plate 51. The mounting plate 51 includes a mounting surface 52 that, when assembled to the turbine housing 8, abuts an outer surface of the exhaust gas inlet 10. The mounting plate 51 includes an outer surface 53 that is opposed to the mounting surface 52, and a bore 55 that extends between and opens at the mounting surface 52 and the outer surface 53. The bore 55 is disposed at a location that is offset from a center of the mounting plate 51. In addition, the bore 55 is longer than the distance between the mounting surface 52 and the outer surface 53. As a result, an outer boss 55a and an inner boss 55b protrude, respectively, each from the mounting surface 52 and the outer surface 53 so as to surround the bore 55. The length of the bore 55 depends on the length of the valve shaft 60, which in turn depends on the requirements of the specific application. The mounting plate 51 includes bolt openings 56 that are configured to receive fasteners 57, whereby the mounting plate 51 is configured to be selectively connected to and detached from the turbine housing 8 at a location overlying the wastegate subassembly port 17, as discussed further below.

The valve shaft 60 is an elongate rod that includes a valve shaft first end 61, an opposed valve shaft second end 62, and a longitudinal axis 63 that extends between the valve shaft first and second ends 61, 62. The valve shaft 60 is disposed in the bore 55 such that the valve shaft longitudinal axis 63 extends in a direction normal to the mounting plate mounting surface 52.

A bushing 68 is disposed at the first end 61 of the shaft 60, at the outer boss 55a. The bushing 68 is a hollow, cylindrical member and has a length that corresponds to the length of the bore 55. The bushing 68 is formed of a material suitable that allows for providing a bearing surface, such as a stainless steel or stainless steel alloy. The bushing 68 is dimensioned to be press fit into the bore 55. In addition, the bushing 68 has an inner diameter dimensioned to receive the valve shaft 60 and support the valve shaft 60 for rotation within the bore 55. A bushing pin 69 is used to further secure the bushing 68 to the outer boss 55a.

The wastegate valve 30 is a flap-type valve and has a valve body 31 and a valve arm 36 that secures the valve body 31 to the first end 61 of the valve shaft 60. The valve body 31 is a thin, circular plate and includes a planar valve face 32 that forms a seal with the valve seat 13a of the bypass port 13 formed in the turbine housing 8. The valve body 31 includes a protruding stem 33 on a side opposed to the planar valve face 32. The stem 33 is configured to be received in, and fixed to, an opening 38 formed in one end 37 of the valve arm 36.

The valve arm 36 includes a plate portion 37 and a hollow cylindrical portion 40 joined to one end of the plate portion 37 such that a longitudinal axis 43 defined by the cylindrical portion 40 is parallel to a broad surface 39 of the plate portion 37. The plate portion 37 provides one end of the valve arm 36 and includes a plate through opening 38 that receives the stem 33 of the valve body 31. The stem 33 is fixed to the plate through opening 38, for example by welding. The cylindrical portion 40 provides a second end of the valve arm 36. The cylindrical portion 40 defines a cylindrical sidewall 42 that extends between an outer open end 44 and an inner open end 45 of the cylindrical portion 40. In addition, a central opening 46 is formed in the sidewall 42 between the outer open end 44 and the inner open end 45 of the cylindrical portion 40. The cylindrical portion 40 receives the valve shaft 60 therein such that the valve shaft longitudinal axis 63 is concentric with the longitudinal axis 43 of the cylindrical portion 40 and the valve shaft first end 61 is generally aligned with the outer open end 44. The valve shaft 60 is fixed to the cylindrical portion 40, for example by welding along the edge defined by a central opening 46 formed in the cylindrical portion 40. The longitudinal axis 43 of the cylindrical portion 40, and thus the valve shaft longitudinal axis 63, defines the axis of rotation of the wastegate valve 30.

Figure 3:
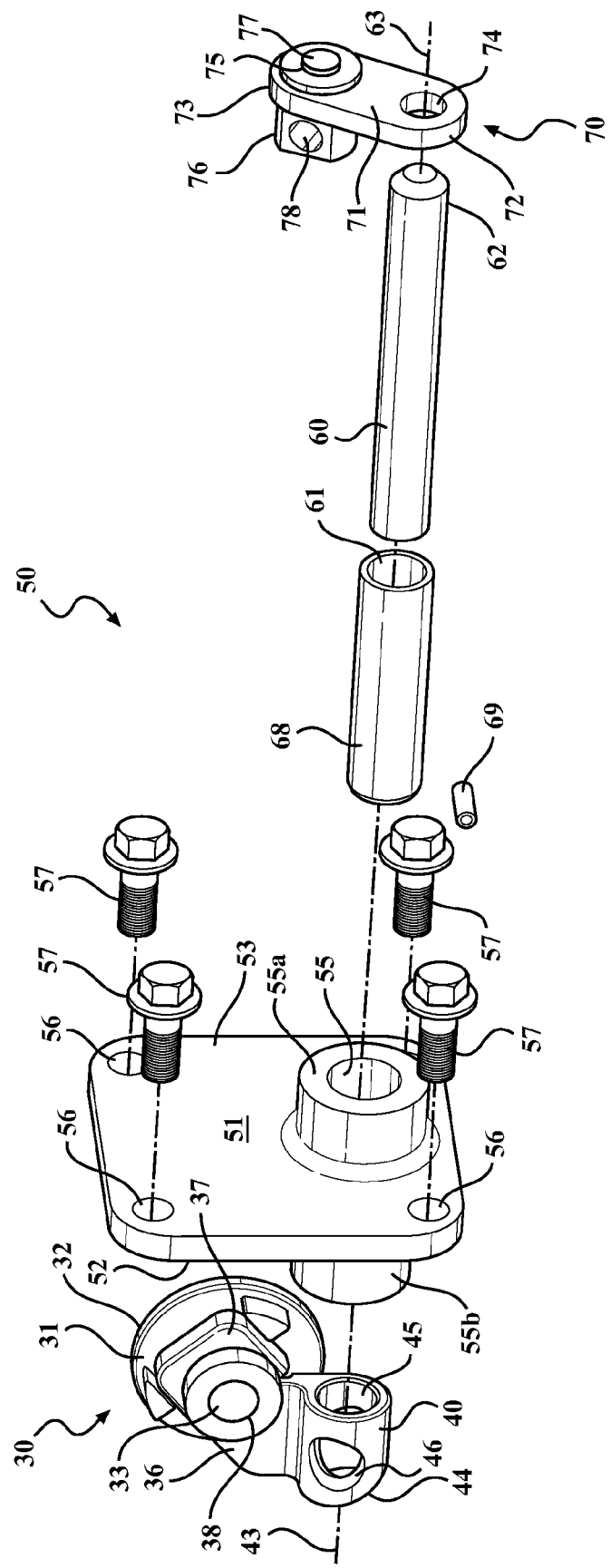
FIG. 3 is an exploded perspective view of the wastegate subassembly of FIG. 2.
Figure 4:
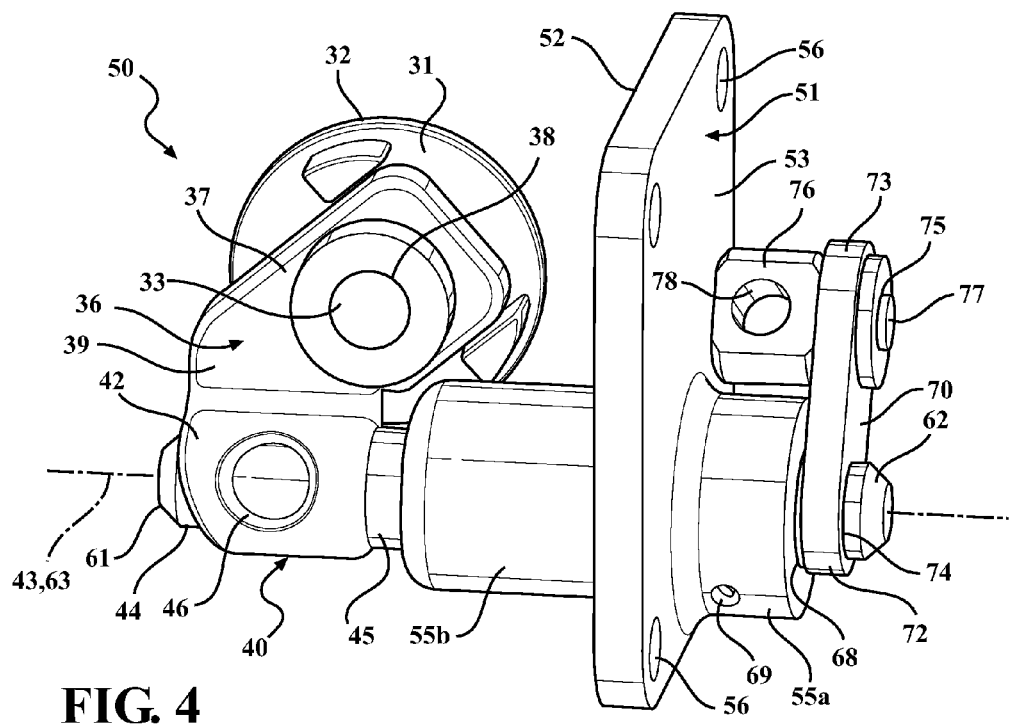
FIG. 4 is an assembled perspective view of the wastegate subassembly of FIG. 2.

In the embodiment of the wastegate valve 30 illustrated in FIGS. 3 and 4, the plate portion 37 is shaped so that the central opening 46 of the cylindrical portion 40 is axially offset relative to the plate through opening 38 toward the mounting plate 51. For example, the plate portion 37 can be configured such that the peripheral edge of the valve body 31 is axially aligned with the valve shaft first end 61. By providing the plate portion 37 with an offset shape, the inner boss 55b and the bushing 68 can be made longer than a distance between the mounting plate 51 and the bypass port 13, and the valve shaft 60 can be made correspondingly longer, while still positioning the valve body 31 in alignment with the bypass port 13. This is advantageous in certain turbine configurations in which loading of the wastegate valve 30 is relatively large, and correspondingly larger valve shaft support is needed. However, the wastegate valve 30 is not limited to having this configuration. For example, in the embodiment of the wastegate valve 30' illustrated in FIGS. 5 and 6, the plate portion 37' is shaped so that the central opening 46' of the cylindrical portion 40' is axially aligned with the plate through opening 38' (e.g., the wastegate valve 30' is not offset toward or away from the mounting plate 51). In this example, the peripheral edge of the valve body 31 extends axially outward beyond the valve shaft first end 61.

The wastegate sub assembly 50 further includes the link arm 70 fixed to the second end 62 of the valve shaft 60. The link arm 70 is configured to connect the valve shaft 60 to the actuator 29 via a linkage (not shown). The link arm 70 includes a link plate 71 and a swivel block 76 that is pivotably secured to the link plate 71 via a pin 77. The link arm 70 further includes a link plate first end 72, and a link plate second end 73 that is opposed to the link plate first end 72. A first through opening 74 that is formed in the link plate 71 adjacent the link plate first end 72 receives, and is fixed to, the second end 62 of the valve shaft 60, for example by welding. A second through opening 75 that is formed in the link plate 71, adjacent the link plate second end 73, receives and rotatably supports the pin 77. In addition, the swivel block 76 is fixed to the pin 77 so as to reside on one side of the link plate 71. For example, in the illustrated embodiment, the swivel block 76 is disposed between the link plate 71 and the mounting plate outer surface 53. The swivel block 76 includes a through opening 78 that receives a portion of the linkage (not shown).

Actuation of the link arm 70 via the linkage causes the link arm 70 to rotate about the valve shaft longitudinal axis 63. Since the link arm 70 and the valve body 31 are fixed to the valve shaft 60, the actuation results in rotation of the valve body 31 about the valve shaft longitudinal axis 63. In particular, the actuator 29 is configured to move the valve body 31 relative to the bypass port 13 between a first position in which the valve face 32 rests on the valve seat 13a and the bypass port 13 is closed, and a second position in which the valve face 32 is lifted away from the valve seat 13a, wherein the bypass port 13 is at least partially open and at least some exhaust gas is permitted to flow through the bypass passage 15 to the exhaust gas outlet 12, bypassing the turbine wheel 16.

Figure 5:
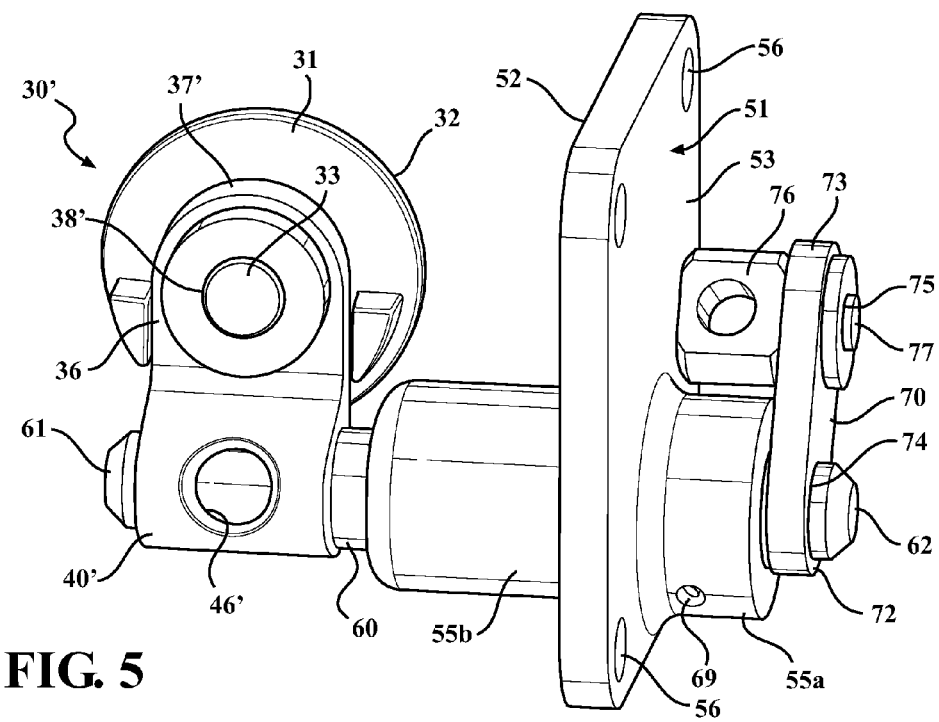
FIG. 5 is an assembled perspective view of an alternative embodiment wastegate subassembly.

Prior to assembly with the turbine housing 8, the components of the wastegate subassembly 50 are preassembled into a single unit, as shown in FIGS. 4 and 5. More specifically, prior to assembly of the wastegate subassembly 50 with the turbine housing 8, the bushing 68 is placed within the bore 55 of the mounting plate 51, and secured to the mounting plate 51 via the bushing pin 69. The valve shaft 60 is placed within the bushing 68 such that the valve shaft first end 61 resides outside the inner boss 55b on a mounting surface-side 52 of the mounting plate 51, and the valve shaft second end 62 resides outside the outer boss 55a on an outer surface-side 53 of the mounting plate 51. The valve arm 36 is secured to the valve shaft first end 61 and the valve body 31 is fixed to the valve arm 36, for example by welding. In addition, the link arm 70 is mounted on the valve shaft second end 62 such that the valve shaft second end 62 extends through the first end opening 74 of the link plate 71, and is secured thereto, for example by welding. As a result, the valve body 31, the valve arm 36, the valve shaft 60 and the link arm 70 forms a rotor that is supported within the bushing for rotation about the valve shaft longitudinal axis 63 relative to the mounting plate 51. The wastegate valve 30, including the valve body 31 and the valve arm 36, together with the valve shaft 60, the mounting plate 51, the bushing 68 and the link arm 70 form a single unit that is the wastegate subassembly 50.

Once the wastegate subassembly 50 has been assembled into a single unit, it can then be easily and quickly assembled on the turbine housing 8 in such a way that the wastegate valve 30 overlies the bypass port 13, and controls exhaust gas flow through the bypass passage 15. The mounting plate 51 is secured to the outer surface of the turbine housing 8 so as to cover and seal the wastegate subassembly port 17. In particular, the mounting surface 52 abuts the outer surface of the exhaust gas inlet 10, and bolts 57 that pass through the mounting plate bolt holes 56 are received in corresponding threaded holes 21 formed in the exhaust gas inlet 10 and secure the mounting plate 51 to the exhaust gas inlet 10. This arrangement permits the mounting plate 51, and thus the entire wastegate subassembly 50 to be easily attached and detached from the turbine housing using hand tools.

Figure 6:
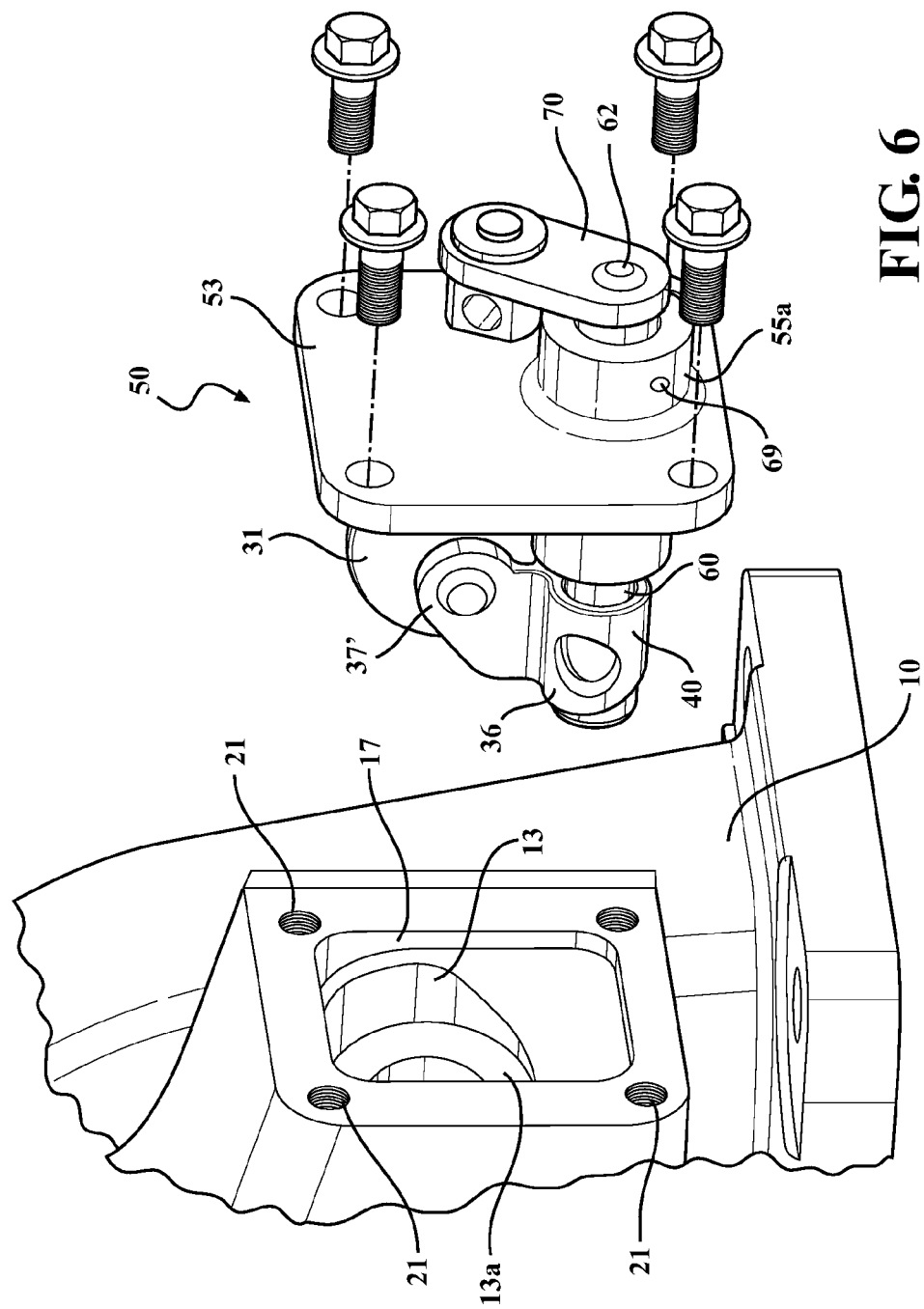
FIG. 6 is an exploded perspective view of the turbine section and the wastegate subassembly of FIG. 5.
Figure 7:
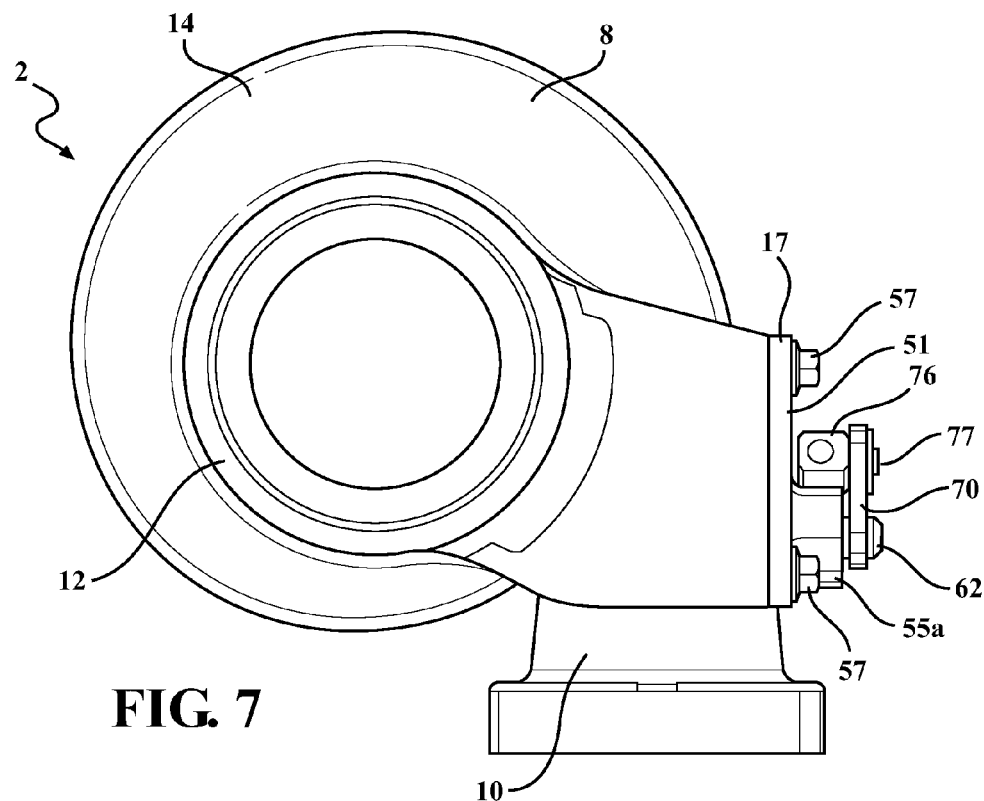
FIG. 7 is a side view of the turbine section including the wastegate subassembly of FIG. 2.
Figure 8:
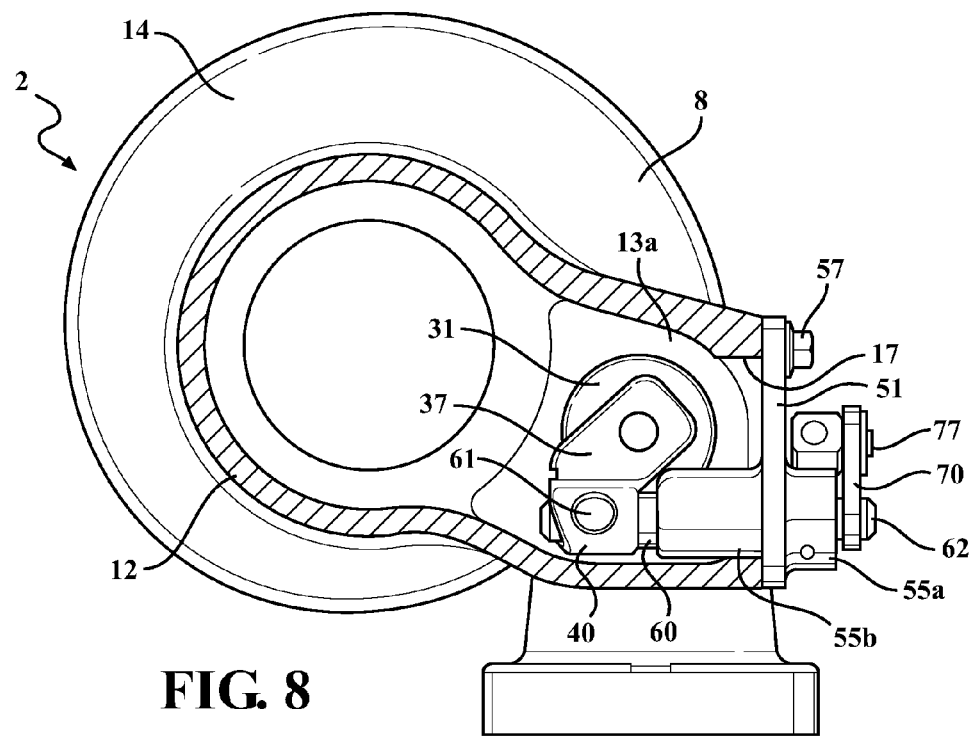
FIG. 8 is a cross-sectional view of the turbine section including the wastegate subassembly of FIG. 2.

Referring to FIGS. 6-8, a method of assembling a wastegate valve 30 with an exhaust gas inlet 10 of a turbocharger turbine 2 such that the wastegate valve 30 controls the flow of exhaust gas through the bypass port 13 will now be described. In an initial step, a preassembled wastegate subassembly 50 is provided (FIG. 6). The wastegate subassembly 50 includes the mounting plate 51 which defines the bore 55, and the valve shaft 60 disposed in the bore such that the first end 61 of the valve shaft 60 resides outside the bore 55 on the mounting surface-side 52 of the mounting plate 51, and the second end 62 of the valve shaft 60 resides outside the bore 55 on an outer surface-side 53 of the mounting plate 51. The wastegate subassembly 50 also includes the wastegate valve 30 secured to the first end 61 of the valve shaft 60. In some embodiments, the wastegate subassembly 50 also includes the bushing 68 disposed in the bore 55 and/or the link arm 70 secured to the second end 62 of the valve shaft 60. It is contemplated that the wastegate subassembly 50 can be selected from a series of preassembled wastegate subassemblies, where the series includes preassembled wastegate subassemblies having various combinations of valve size and shape, valve arm size and shape, valve shaft diameter and/or length, mounting plate size and shape, varying component materials, etc. Selection of a particular preassembled wastegate subassembly 50 is made based on the requirements of the specific application.

Once the wastegate subassembly 50 is provided, the wastegate subassembly 50 is assembled with the turbocharger turbine exhaust gas inlet 10. Assembly of the wastegate subassembly 50 is achieved by inserting the first end 61 of the valve shaft through the wastegate subassembly port 17 until the mounting plate 51 abuts the exhaust gas inlet outer surface, and the bolt openings 56 are aligned with the threaded holes 21 formed in the exhaust gas inlet 10 (FIGS. 6 and 7). When the wastegate subassembly 50 is in this position, 1) the wastegate valve 30 is disposed adjacent the bypass port 13 with the valve face 32 oriented and positioned so as to be able to rest on the bypass port valve seat 13a, 2) the mounting plate 51 mounting surface 52 abuts an outer surface of the exhaust gas inlet 10 in such a way that the mounting plate 51 overlies and closes the wastegate subassembly port 17, and 3) the second end 62 of the valve shaft 60 is disposed outside the exhaust gas inlet 10 (FIG. 8).

The outer surface of the turbine housing 8 may be machined in the vicinity of the wastegate subassembly port 17 to provide a smooth, planar mating surface for the mounting plate 51 and minimize exhaust gas leakage. In some embodiments, a seal such as a gasket (not shown) is disposed between the mounting surface 52 and the outer surface of the exhaust gas inlet 10 to further minimize exhaust gas leakage.

After the wastegate subassembly 50 has been assembled with the exhaust gas inlet 10, the mounting plate 51 is secured to the outer surface of the exhaust gas inlet using the bolts 57. In addition, the link arm swivel block 76 is connected to the actuator 29 via the linkage.

The wastegate subassembly 50 has been described as including the bushing 68 and pin that secures the bushing 68 to the mounting plate, but the wastegate subassembly 50 is not limited to this configuration. For example, in some embodiments, the mounting plate 51 is formed of a material M that is different than the material used to form the turbine housing 8. In particular, the material M is suitable for forming bushings and/or bearing surfaces. For example, the mounting plate 51 may be formed of a stainless steel or stainless steel alloy. As a result, the bore 55, which is formed in the mounting plate 51, includes an inner surface formed of the material M, and the bushing 68 and bushing pin 69 are omitted, whereby the wastegate subassembly includes fewer parts, the size of the wastegate subassembly 50 is reduced and assembly of the wastegate subassembly 50 is simplified.

The wastegate subassembly 50 has been described as including the link arm 70, but is not limited to this configuration. For example, in some embodiments, the link arm 70 is not part of the preassembled wastegate subassembly 50, and instead is secured to the wastegate subassembly 50 at the time of assembly of the exhaust gas turbocharger 1. In another example, the link arm 70 is included in the preassembled wastegate subassembly 50, but has a different structure. In this example, the link arm 70 may have the form of a gear or spline to facilitate connection to a geared actuator via an intermediate gear system.

The wastegate subassembly port 17 is illustrated as having a rectangular shape, but is not limited to this shape. For example, the wastegate subassembly port 17 may have a circular shape, an irregular shape, or any other convenient shape.

Aspects described herein can be embodied in other forms and combinations without departing from the spirit or essential attributes thereof. For instance, while embodiments described herein are directed to wastegate subassemblies for controlling exhaust gas flow through a turbocharger turbine; it will be appreciated that such assemblies and assembly methods can be applied to other valved devices. Thus, it will of course be understood that embodiments are not limited to the specific details described herein, which are given by way of example only, and that various modifications and alterations are possible within the scope of the following claims.

What is claimed, is:

1. A wastegate subassembly (50) comprising
a mounting plate (51) comprising a mounting surface (52), an outer surface (53) that is opposed to the mounting surface (52) and a bore (55) that opens at both the mounting surface (52) and the outer surface (53), a valve shaft (60) disposed in the bore (55) such that a first end (61) of the valve shaft (60) resides outside the bore (55) on a mounting surface-side (52) of the mounting plate (51), and a second end (62) of the valve shaft (60) resides outside the bore (55) on an outer surface-side (53) of the mounting plate (51); and
a wastegate valve (30) including a valve body (31) and a valve arm (36) that secures the valve body (31) to the first end (61) of the valve shaft (60);
wherein the mounting plate (51) is configured to be selectively connected to and detached from a turbocharger (1) housing.

2. The wastegate subassembly (50) of claim 1, wherein the mounting plate (51) is planar, has a rectangular peripheral shape, and includes bolt openings (56) configured to receive a fastener that secures the mounting plate (51) to a housing of a turbocharger turbine (2).

3. The wastegate subassembly (50) of claim 1, wherein the valve body (31) comprises a planar valve face (32), and protruding stem (33) on a side opposed to the valve face (32).

4. The wastegate subassembly (50) of claim 1, wherein the valve arm (36) comprises a plate portion (37) that is connected to the valve body (31), and a hollow cylindrical portion (40) disposed at one end (37) of the plate portion (37), the cylindrical portion (40) configured to receive the valve shaft (60) therein and disposed at one end (37) of the plate portion (37) such that a longitudinal axis (43) of the cylindrical portion (40) is parallel to a broad surface (39) of the plate portion (37).

5. The wastegate subassembly (50) of claim 4, wherein the plate portion (37) includes a plate through opening (38) that receives a portion of the valve body (31),
the cylindrical portion (40) includes a first open end (44), a second open end (45), and a central opening (46) disposed between the first open end (44) and the second open end (45), and the plate through opening (38) is axially offset relative to the central opening (46).

6. The wastegate subassembly (50) of claim 1, comprising a bushing (68) disposed in the bore (55), the bushing (68) configured to support the valve shaft (60) for rotation within the bore (55).

7. The wastegate subassembly of claim 1, comprising a link arm (70) fixed to the second end (62) of the valve shaft (60), the link arm (70) configured to connect the valve shaft (60) to an actuator (29).

8. A turbocharger (1) comprising
a turbine housing (8) defining an exhaust gas inlet (10), an exhaust gas outlet (12) and a volute (14) that connects the exhaust gas inlet (10) to the exhaust gas outlet (12), a turbine wheel (16) disposed in the exhaust gas inlet (10) between the volute (14) and the exhaust gas outlet (12), a bypass port (13) is formed in the exhaust gas inlet (10) that communicates with the exhaust gas outlet (12) and bypasses the turbine wheel (16), a second port (17) formed in the exhaust gas inlet (10) in the vicinity of the bypass port (13), and a wastegate subassembly (50) comprising a mounting plate (51) comprising a mounting surface (52), an outer surface (53) that is opposed to the mounting surface (52) and a bore (55) that opens at both the mounting surface (52) and the outer surface (53), a valve shaft (60) disposed in the bore (55) such that a first end (61) of the valve shaft (60) resides outside the bore (55) on a mounting surface-side (52) of the mounting plate (51), and a second end (62) of the valve shaft (60) resides outside the bore (55) on an outer surface-side (53) of the mounting plate (51); and a wastegate valve (30) including a valve body (31) and a valve arm (36) that secures the valve body (31) to the first end (61) of the valve shaft (60), wherein the mounting plate (51) is detachably secured to an outer surface of the exhaust gas inlet (10) such that the mounting plate (51) closes the second port (17) and the valve body (31) is positioned to control exhaust gas flow through the bypass port (13).

9. The turbocharger (1) of claim 8, wherein the turbine housing (8) is formed of a first material, and the mounting plate (51) is formed of a second material, wherein the second material different from the first material.

10. The turbocharger (1) of claim 8, comprising a bushing (68) disposed in the bore (55), the bushing (68) configured to support the valve shaft (60) for rotation within the bore (55).

11. The turbocharger (1) of claim 8, comprising a link arm (70) fixed to the second end (62) of the valve shaft (60), the link arm (70) configured to connect the valve shaft (60) to an actuator (29).

12. The turbocharger (1) of claim 8, wherein the mounting plate (51) is planar, has a rectangular peripheral shape, and includes bolt openings (56) configured to receive a fastener (57) that secures the mounting plate (51) to a housing of a turbocharger turbine (2).

13. The turbocharger (1) of claim 8, wherein the valve arm (36) comprises a plate portion (37) that is connected to the valve body (31), and a hollow cylindrical portion (40) disposed at one end (37) of the plate portion (37), the cylindrical portion (40) configured to receive the valve shaft (60) therein and disposed at one end (37) of the plate portion (37) such that a longitudinal axis (43) of the cylindrical portion (40) is parallel to a broad surface (39) of the plate portion (37).

14. The turbocharger (1) of claim 13, wherein the plate portion (37) includes a plate through opening (38) that is fixed to a portion of the valve body (31), the cylindrical portion (40) includes a first open end (44), a second open end (45), and a central opening (46) disposed between the first open end (44) and the second open end (45), the plate through opening (38) is axially offset relative to the central opening (46).

15. A method of assembling a wastegate valve (30) with an exhaust gas inlet (10) of a turbocharger turbine (2) such that the wastegate valve (30) controls the flow of exhaust gas through a bypass port (13) formed in the exhaust gas inlet (10), the method comprising providing a pre-assembled wastegate subassembly (50) that includes a mounting plate (51) comprising a mounting surface (52), an outer surface (53) that is opposed to the mounting surface (52) and a bore (55) that opens at both the mounting surface (52) and the outer surface (53), a valve shaft (60) disposed in the bore (55) such that a first end (61) of the valve shaft (60) resides outside the bore (55) on a mounting surface-side (52) of the mounting plate (51), and a second end (62) of the valve shaft (60) resides outside the bore (55) on an outer surface-side (53) of the mounting plate (51); and a wastegate valve (30) including a valve body (31) and a valve arm (36) that secures the valve body (31) to the first end (61) of the valve shaft (60);

inserting the first end (61) of the valve shaft (60) through a second port (17) formed in the exhaust gas inlet (10) such that the wastegate valve (30) is disposed adjacent the bypass port (13) and the mounting plate (51) abuts an outer surface of the exhaust gas inlet (10), and securing the mounting plate (51) to the outer surface (53) of the exhaust gas inlet (10).

\* \* \* \* \*